2,806,843
CYCLODIENE SULFO-RESIN AND PROCESS OF PREPARING THE SAME

Lester Marshall Welch, Madison, N. J., assignor, by mesne assignments, to Carter Bell Manufacturing Company, Springfield, N. J., a corporation of New Jersey No Drawing. Application April 1, 1953,
Serial No. 346,265

7 Claims. (Cl. 260—79)

This invention relates to an oil resistant rubber extender, its method of preparation, and its use in rubber-like and plastic compositions. More particularly it relates to a product prepared by reacting an unsaturated cyclic diene hydrocarbon with a large proportion of sulfur, and to blends of this product with rubber-like materials such as butadiene-styrene emulsion copolymers.

Specifically it has been discovered that a surprisingly oil resistant resin can be prepared by reacting dicyclopentadiene or related cyclic diolefins at elevated temperature with at least 30 percent, and preferably 40 to 200 or even 300 percent of sulfur based on diolefin. The resulting hard sulfo-resin may be mixed in substantial amounts with various rubber-like diolefin polymers or copolymers to product elastic compositions characterized by good oil resistance as well as excellent tensile properties.

When blended with elastomers of low or moderate oil resistance, such as GR-S or neoprene, the novel resin will noticeably increase the oil resistance of the elastomer. And when blended with rubbers of the more highly oil resistant type such as copolymers of about 50 to 75 percent butadiene and about 50 to 25 percent of acrylonitrile, the novel sulfo-resins may serve as inexpensive extenders without reducing the inherent oil resistance and other valuable properties of the elastomer. The new resins also tend to improve the ozone resistance of rubber compositions in which they are incorporated.

The oil resistance of the sulfo-resins may also be used to advantage in floor tile and linoleum compositions, caulking compounds, adhesives, thermoplastic molding compositions and the like. These sulfo-resins are also useful as substitutes for Thiokol in certain applications such as plasticization of sulfur cements.

The main raw material used in making the novel resins is a cyclic diolefin, notably dicyclopentadiene and methylcyclopentadiene dimer as well as their higher polymers such as trimers and tetramers. However, monomeric cyclopentadiene, alkyl substituted derivatives of mono- or dicyclopentadiene having one or two alkyl substituents of one to three carbon atoms each, such as ethylcyclopentadiene, dimethylcyclopentadiene, dipropylcyclopentadiene or their low polymers, as well as cyclohexadiene and its similarly alkyl substituted homologs may be used likewise. In general, these materials may be described as unsaturated hydrocarbons consisting essentially of a cyclodiene having up to 5 primary rings (disregarding the effect of endomethylene groups on ring count), each ring containing 5 to 6 carbon atoms. Also, the cyclic dimers, trimers, and tetramers of the lower conjugated aliphatic diolefins such as butadiene, isoprene or piperylene may be used. For example, vinyl cyclohexene, a cyclic dimer of butadiene, is quite satisfactory. As is well known, cyclodienes of the above type such as dicyclopentadiene can be obtained from steam-cracked petroleum as well as from coke ovens. For instance, a satisfactory commercial raw material is a mixture containing about 85% cyclopentadiene and 15% methylcyclopentadiene, or the corresponding dimers.

When reacting the cyclodiene with sulfur in accordance with the present invention, the optimum amount of sulfur will depend somewhat on the oil resistance and other final properties desired. Increasing sulfur concentrations generally tend to increase the final oil resistance, but at the same time the compatibility of the product with elastomers decreases.

It has been found that the amount of sulfur which can be chemically reacted by addition to the cyclodienes to form sulfo-resins is proportional to the unsaturation of the diene, i. e. the number of double bonds per unit of weight. For example, dicyclopentadiene will react with a maximum of twice its own weight of sulfur without substantial dehydrosulfurization and the tetramer reacts with up to an equal weight of sulfur. This corresponds to a maximum of four atoms of sulfur per double bond. The reaction with the cyclopentadiene monomer does not correspond to the above relation because a very substantial amount of dimerization results under sulfurization conditions such that the product is partially sulfurized dicyclopentadiene. Often it is preferable to react less than the maximum of four atoms of sulfur per double bond because the products are more thermoplastic and have better compatibility with elastomers. For many applications two atoms of sulfur per double bond (predominantly disulfide linkage) is the optimum for best thermal stability, thermoplasticity and compatibility.

The reaction temperature most suitable for the present purpose may range between about 280 and 350° F., at which level the reaction mixture may be held for about 2 to 24 hours, preferably with some stirring. In any event the reaction temperature and time is kept low enough so that the reaction between the cyclodiene and sulfur is essentially only one of addition of the sulfur to the double bonds of the hydrocarbon. In some cases, especially above 320° F., a very slight amount of substitution may result. However, the total hydrogen sulfide produced equals less than 1%, and preferably less than 0.1% of the weight of the total product. If temperatures in excess of 350° F. are used the predominant reaction is no longer addition but rather substitution with the formation of hydrogen sulfide. Substantially any amount of sulfur can be reacted under these conditions but the products are not thermoplastic.

When relatively high proportions of sulfur, e. g. 100% or more based on the weight of cyclodiene, are used, an especially highly insoluble product tends to result. While this may often be highly desirable, it may also sometimes interfere with keeping the reaction mixture uniformly stirred and homogeneous during synthesis. In addition the resulting sulfo-resin may not be sufficiently thermoplastic to permit easy compounding into useful articles. For these reasons it has been found especially advantageous to add to such reaction mixtures a suitable diluent which is non-reactive with sulfur. When the reaction is carried out in a closed vessel, 5 to 100% low boiling solvents such as C5 or C6 paraffinic, naphthenic or aromatic hydrocarbons may be used to help control the reaction. However, such diluents must later be removed from the product which is a costly operation. On the other hand, higher boiling diluents, especially those capable of acting as plasticizers for the sulfo-resin as well as for the eventual elastomeric or plastic composition may serve a useful purpose when present in the product and are therefore preferred. Such a diluent may be an aromatic, paraffinic or naphthenic hydrocarbon process oil which may be characterized by being fluid at normal temperature and boiling within the temperature range of about 400 to 800° F. Suitable commercial products are naphthenic oils known under trademarks such as "Mentor 28" and "Circo-Light" (naphthenic), aromatic oils such as "Bardol," "Sovaloid C," and "Paraflex," and many others. Furthermore, especially when the sulfo-resin is primarily intended for use in oil resistant compositions of nitrile rubber or the like, it may be advantageous to use a non-hydrocarbon diluent in the synthesis of the sulfo-resin. In particular such non-hydrocarbon diluents may be ester type rubber plasticizers such as dibutyl or dioctyl phthalates, tricresyl or trioctyl phosphates as well as the corresponding $C_{4-12}$ alkyl or aryl esters of sebacic, adipic and other acids well known in the rubber compounding art.

Depending on the plasticity or softening point desired of the sulfo-resin, and depending on the proportion of sulfur present, about 5 to 50% of inert diluent based on weight of hydrocarbon may be advantageously used in the synthesis, 10 to 30% being especially preferred when the sulfo-resin contains 40% or more of combined sulfur.

In carrying out the synthesis it is suitable to mix the cyclodiene feed, diluent if any, and sulfur, in the proportions described earlier herein, and the mixture is then brought to reaction conditions which have been set forth above. The reaction may be done in an open kettle, though a closed vessel is generally preferred so as to avoid undue losses of the fairly volatile cyclodiene feed. Furthermore, in a closed vessel it is also possible to operate in the absence of air, for instance in an atmosphere of added hydrogen sulfide, which tends to favor the formation of relatively light colored products. When operating in a closed vessel, the maximum pressure need not exceed about 10 p. s. i. g., though pressures as high as 100 p. s. i. g. may likewise be used, especially when a relatively volatile inert diluent is present.

Depending on the size of the batch it may be sufficient to heat the mixture at reaction temperature for only about two or three hours, and to allow the reaction to complete itself by after-curing during the slow cooling which follows and which may take a day or more in commercial size units. Also, especially when stirring of the reaction mixtures is impractical, it may be completed by baking at a temperature about 5 to 30° F. lower than the principal reaction temperature. Higher temperature baking is to be avoided because of substitution and cyclization reactions which result. In general it is preferred to cook no longer than is necessary for the addition of sulfur to the cyclodiene.

The finished sulfo-resin, somewht depending on the amount of sulfur and inert diluent used in its synthesis, is a hard thermoplastic resin having a softening point below about 400° F., preferably between about 100 and 320° F. as determined by the conventional ASTM ring-and-ball method. The sulfo-resins in the absence of diluent give an typical conchoidal fracture on impact at room temperature. They are not soluble in naphtha or paraffinic hydrocarbons, but can generally be dissolved in hot aromatic solvents such as benzene or toluene or more potent solvents such as pyridine, carbon disulfide or paradichlorobenzene. The color is generally dark amber unless especially prepared as mentioned above to give light amber resins.

The novel sulfo-resins, preferably in granulated form, may be compounded into various rubbers on conventional compounding mills or mixers, in ratios which may range from 5 to 200 or even 500% based on the weight of the rubber, depending on the sulfur content of the resin, the nature of the rubber, as well as on the desired tensile properties, resistance to oil, and ultimate cost of the vulcanized compound. For instance, for wire insulation purposes requiring good oil and ozone resistance rather than good tensile properties, fresh or reclaimed hydrocarbon rubber such as GR–S may be mixed with 150 to 500% of sulfo-resin. On the other hand, when good tensile properties as well as oil resistance are essential, it is preferable to add between about 50 and about 120% of sulfo-resin to the hydrocarbon rubber, or to use an oil resistant elastomer such as nitrile rubber in conjunction with the sulfo-resin when particularly high oil resistance is important. Furthermore, when low cost rather than superior oil resistance is the prime objective, as little as 5% of the sulfo-resin may be added which, unlike most other extenders, does not generally impair the intrinsic properties of the elastomer itself.

The sulfo-resins are especially effective for compounding in GR–S type elastomers, that is, rubber-like materials prepared by copolymerizing in aqueous emulsion about 50 to 85% of a conjugated $C_{4-6}$ diolefin such as butadiene-1,3,isoprene, or 2,3-dimethylbutadiene-1,3, with about 50 to 15% of a vinyl aromatic compound such as styrene, vinyl toluene, vinyl naphthalene and the like. Peroxy-catalysts such as potassium persulfate, benzoyl peroxide or the like are usually used. Copolymers of about 75% butadiene and about 25% styrene are particularly preferred as a synthetic rubber, because of their good balance of properties, but resinous copolymers composed of up to about 80% styrene and 20% butadiene are also compatible with the novel sulfo-resins. The actual preparation of the synthetic polymers, both by the older method under moderate heat as well as the more recently developed cold polymerization process, is well known and need not be described here.

The sulfo-resins are also useful in conjunction with other diolefinic rubbers such as natural rubber (polyisoprene) or synthetic polybutadiene, or with oil resistant elastomers such as neoprene (polychloroprene) or GR–A type elastomers. The latter are well-known emulsion co-polymers containing combined therein about 50 to 85% of a conjugated $C_{4-6}$ diolefin, notably butadiene, the balance usually being acrylonitrile. However, methacrylonitrile or chloracrylonitrile and the like are also sometimes used as alternative comonomers. These nitrile co-polymers are prepared in essentially the same well known manner as GR–S type elastomers.

In compounding the sulfo-resins with elastomers conventional formulas appropriate for the particular elastomer and intended use may be employed. Thus the compound may include carbon black, magnesia or other inorganic fillers, pigments, pine tar or other processing oils, zinc oxide, stearic acid, accelerators such as mercaptobenzothiazole, benzothiazyl disulfide, tetramethyl thiuram disulfide, N - cyclohexyl - 2 - benzothiazolesulfenamide or the like, or any proper combination thereof, as well as free sulfur. However, even the latter is not indispensable, since the sulfo-resin itself may act as a vulcanizing agent for diolefinic rubbers, depending on the sulfur concentration as well as the temperature and reaction time employed in synthesizing the sulfo-resin.

Several specific examples will now be given to illustrate the nature and advantages of the invention. Unless otherwise indicated, all proportions of materials are expressed herein on a weight basis.

EXAMPLE 1

A number of different sulfo-resins were prepared by reacting dicyclopentadiene with various proportions of sulfur, with and without added diluent. The dicyclopentadiene was a commercial product containing about 85% dicyclopentadiene and 15% methyl homologs. "Mentor 28," a naphthenic light process oil, was used as diluent as indicated.

In each run the cyclodiene, diluent if any, and pulverized sulfur were added to the kettle and heated to reaction temperature with stirring. The mixture was then maintained at reaction conditions for a given period, with stirring as far as practical. In all runs the reaction mixture was finally allowed to cool slowly in the course of about 24 hours, and tested. Only in run 4 was the reaction mixture kept at a somewhat reduced secondary cook temperature between the principal reaction period and the cooling period.

The addition of sulfur to cyclodienes is highly exothermic and good temperature control is required to avoid the undesirable dehydrosulfurization reaction. External cooling of the reactants is generally required. Diluents may also be employed to help control the rate of the reaction. In any case it is preferable to hold the cook temperature below 300° F. for the initial stage of the reaction (about 1 hour) and then to raise the temperature, if desired, to complete the addition reaction. Subsequent baking at lower temperature may be employed to increase the softening point of the product and in cases where continued stirring is impossible to complete the addition of sulfur to cyclodiene.

A summary of the several syntheses is given in Table I.

cient oil resistance to all-hydrocarbon rubbers such as GR–S to make the latter competitve with the considerably more expensive neoprene compounds. For example, a typical high quality neoprene compound shows the following swells in the same test: ASTM #1 6%; ASTM #3 101%.

It can be seen that the vulcanizates have excellent tensile strength, and maximum elongations progressively shorter with increasing sulfur content of the resin. The oil resistance of the vulcanizates is roughly proportional to the sulfur content of the added resin.

Table I.—Synthesis of cyclodiene-sulfo resins

| Run No. | Cyclodiene | Parts by weight | | | Cook | | Softening point, R. & B. | Remarks |
|---|---|---|---|---|---|---|---|---|
| | | Cyclodiene | Sulfur | Diluent | Time, hrs. | Temp., °F. | | |
| 1 | Dicyclopentadiene a | 100 | 40 | None | 3¼ | 280–300 | 220 | Open kettle—20% weight loss. |
| 2 | ----do---- | 100 | 40 | 20 | 2½ | 280–300 | 100 | Closed kettle—No loss.b |
| 3 | ----do---- | 100 | 100 | None | 2½ | 280–310 | 268 | Do. |
| 4 | ----do---- | 100 | 200 | None | 2 | c 280–320 | 330 | Do. |
| 5 | Polycyclopentadiene d | 100 | 100 | None | 2 | 280–290 | 285 | Open kettle—slight loss. |
| 6 | Vinylcyclohexene | 100 | 100 | None | 3 | 280–300 | 225 | Closed kettle. |
| 7 | Di(methylcyclopentadiene) | 100 | 100 | None | 2½ | 280–300 | 250 | Do. | a Commercial product—approximately 85% cyclopentadiene and 15% methylcyclopentadiene dimers.
b Pressure about 10 p. s. i. g.
c Additional bake of 3 hours at 290° F. to complete reaction.
d Obtained by heating cyclopentadiene in closed vessel for 4 hours at 200° C.—a mixture of dimer, trimer, tetramer and pentamer.

It can be seen that increasing sulfur content increases the softening point of the resinous product and that useful resins can be obtained with as little as 40% of sulfur, as well as with 100 or even 200% of sulfur based on the cyclodiene feed. The products of Table I were almost completely soluble in hot toluene. For example, run 3 dissolved to the extent of 95% in boiling toluene in 3 hours and run 4 dissolved to the extent of 95% in 12 hours. A comparison of runs 1 and 2 shows that the inclusion of an inert hydrocarbon diluent in the feed offers another ready means of lowering the softening point of the final product. It is also to be noted that an essentially quantitative yield of sulfo-resin was obtained in runs 2, 3, 4, 6 and 7 whereas in run 1, which was performed in an open kettle, about 20% of the cyclodiene feed was evaporated and lost. Higher boiling dienes may be reacted in an open kettle with relatively little loss, as shown in run 5.

All of the sulfo-resins described above remained unchanged for indefinite periods following completion of the reaction, showing no signs of either embrittlement or sulfur bloom.

Instead of using dicyclopentadiene as starting material, a closely similar product may be obtained when using monomeric cyclopentadiene under the same general conditions, since cyclopentadiene will largely change into the dimer as the reaction proceeds. Furthermore, still other cyclodienes and cyclodiene dimers, including di(methyl cyclopentadiene), vinylcyclohexene and higher polymers of cyclopentadienes, may be used likewise as shown in Table I.

EXAMPLE 2

The first four sulfo-resins prepared in Example 1 were compounded with commercial GR–S synthetic rubber. The compounding formulas and comparative results are summarized in Table II. Attempts to put as much as 50 parts of coumaroneindene resin into the same compounds were unsuccessful as the stock was very soft and sticky and poor cures were obtained.

The immersion tests on the several vulcanizates show that the novel sulfo-resins are capable of imparting sufficient Table II.—Dicyclopentadiene sulfo-resins in GR–S

[50 parts.]

A GR–S base recipe containing GR–S 100 parts, HMF carbon black 50, zinc oxide 4, stearic acid 1, Santocure a 1, Age Rite Resin b 1 and sulfur 1 was compounded with dicyclopentadiene-sulfo resins as follows:

| | A | B | C | D |
|---|---|---|---|---|
| Resin added (per 100 GR–S) | 50 parts #1 | 50 parts #2 | 50 parts #3 | 50 parts #4 |
| Stocks cured at 315° F. | | | | |
| Tensile, p. s. i., 20' | 3,385 | 2,870 | 2,925 | 3,415 |
| Ultimate elongation, percent, 20' | 275 | 425 | 250 | 150 |
| Shore A, hardness, 20' | 75 | 64 | 76 | 83 |
| Volume percent swell (immersion 70 hrs. at 212° F.), 20' cures: | | | | |
| ASTM oil #1 | 8 | 16 | 16 | 3 |
| ASTM oil #3 | 118 | 183 | 136 | 77 | a N-cyclohexyl-2-benzothiazylsulfenamide.
b Aldol-alpha-naphthylamine.

EXAMPLE 3

In another set of tests relatively large ratios of the sulfo-resins of Example 1 were compounded with GR–S rubber, along with an added plasticizer either of the hydrocarbon type or of the ester type. The pertinent data are summarized in Table III. When using high concentrations of resin, plasticizers are required if high elongations and soft elastic vulcanizates are desired. The low swell of ester-plasticized compounds C and D in the aromatic test oil ASTM #3 solvent is especially noteworthy.

Table III.—Dicyclopentadiene sulfo-resins in GR-S
[100 and 200 parts.]

A masterbatch containing GR-S 100 parts, HMF carbon black 50, zinc oxide 4, stearic acid 1, Santocure 1, Age Rite Resin 1, and sulfur 1 was compounded with the dicyclopentadiene sulfo-resins as follows:

| Stock | A | B | C | D |
|---|---|---|---|---|
| | 100 parts resin #2, 30 parts process oil ᵃ | 100 parts resin #3, 30 parts process oil ᵃ | 100 parts resin #4, 30 parts DBP ᵇ | 200 parts resin #3, 30 parts DBP ᵇ |
| | Stocks cured at 315° F. | | | |
| Tensile, p. s. i.: | | | | |
| 15′ | 1,415 | 1,705 | 1,845 | 670 |
| 20′ | 1,495 | 1,895 | 2,015 | 750 |
| Ultimate elongation, percent: | | | | |
| 15′ | 650 | 350 | 175 | 250 |
| 20′ | 550 | 300 | 150 | 250 |
| Shore A hardness: | | | | |
| 15′ | 45 | 65 | 76 | 86 |
| 20′ | 47 | 66 | 78 | 87 |
| Volume percent swell (immersion 70 hrs. at 212° F.), 20′ cures: | | | | |
| ASTM oil #1 | −14 | −10 | −17 | −23 |
| ASTM oil #3 | 195 | 105 | 35 | 71 |
| Compression set, 22 hrs. at 158° F., method B, 20′ | 56 | 65 | 62 | 65 |

ᵃ "Circolite" (naphthenic light process oil).
ᵇ DBP=dibutyl phthalate.

EXAMPLE 4

Two compounds of GR-S with different sulfo-resins were prepared and vulcanized in the absence of any added free sulfur, as summarized in Table IV.

Table IV.—Curing GR-S without additional sulfur

A masterbatch containing GR-S 100 parts, HMF carbon black 50, zinc oxide 4, stearic acid 1, Santocure 1, Age Rite Resin 1 and no added sulfur was compounded with the dicyclopentadiene sulforesins as follows:

| Stock | A | B |
|---|---|---|
| | 100 parts resin #3 | 100 parts resin #4 |
| | Stocks cured at 315°F. | |
| Tensile, p. s. i.: | | |
| 15′ | 1,665 | 1,785 |
| 20′ | 1,805 | 2,015 |
| Ultimate elongation, percent: | | |
| 15′ | 400 | 225 |
| 20′ | 350 | 200 |
| Shore A hardness: | | |
| 15′ | 63 | 71 |
| 20′ | 64 | 74 |
| Volume percent swell (immersion 70 hrs. at 212°F.), 20′ cures: | | |
| ASTM oil #1 | −8 | −17 |
| ASTM oil #3 | 122 | 49 |

The results show that satisfactory cures of diolefinic rubbers may be obtained in the presence of sulfo-resins without any addition of free sulfur. However, it is generally preferable to use some sulfur in the recipe for better physical properties.

EXAMPLE 5

The sulfo-resins also possess a high degree of utility in connection with rubbers such as neoprene (polychloroprene) which have an appreciable oil resistance of their own. This is illustrated in Table V.

Table V.—Dicyclopentadiene sulfo-resins in neoprene

A neoprene type W base recipe containing neoprene type W 100 parts, Neozone A¹ 2, stearic acid 0.5, petrolatum 1, light calcined magnesia 2, MT carbon black 50, zinc oxide 5 and Permalux² 0.5 was compounded with dicyclopentadiene-sulfo-resins as follows:

| Stock | A | B |
|---|---|---|
| Resin added (per 100 parts neoprene) | None | 50 parts resin #2 |
| | Stocks cured at 307° F. | |
| Tensile, p. s. i.: | | |
| 20′ | 2,595 | 2,155 |
| 30′ | 2,460 | 2,000 |
| Ultimate elongation, percent: | | |
| 20′ | 600 | 1,000 |
| 30′ | 600 | 975 |
| Shore A, hardness: | | |
| 20′ | 56 | 49 |
| 30′ | 55 | 44 |
| Volume percent swell (immersion 70 hrs. at 212°F.), 30′ cures: | | |
| ASTM oil #1 | 6 | −15 |
| ASTM oil #3 | 101 | 74 |
| Compression set, percent, method B, 22 hrs. at 158°F., 30′ | 7 | 40 |

¹ Phenyl-alpha-naphthylamine.
² Di-ortho-tolylguanidine salt of dicatechol borate.

EXAMPLE 6

The utility of the cyclodiene sulfo-resins in still more highly oil resistant elastomers such as Hycar OR 25 (copolymer of about 75% butadiene-1,3 and 25% of acrylonitrile) is illustrated in Table VI.

Table VI.—Dicyclopentadiene sulfo-resins in nitrile rubber

A base recipe containing Hycar OR 25 100 parts, zinc oxide 5, stearic acid 1, Altax (benzothiazyl disulfide) 1.5, sulfur 1.5, HMF carbon black 50 and dioctylphthalate 20 was compounded with dicyclopentadiene sulfo-resins as follows:

| | A | B | C | D | E |
|---|---|---|---|---|---|
| Resin added (per 100 parts of Hycar OR 25) | Resin #3, 50 pts. | Resin #3, 100 pts. | Resin #4, 50 pts. | Resin #4, 100 pts. | Control (no resin) |
| | Stocks cured at 310°F. | | | | |
| Tensile, p. s. i., 30′ | 2,710 | 1,880 | 2,950 | 2,195 | 2,800 |
| Ultimate elongation, percent, 30′ | 325 | 260 | 225 | 200 | 300 |
| Shore A, hardness, 30′ | 71 | 79 | 76 | 85 | 64 |
| Volume percent swell (immersion 70 hrs. at 212°F.), 30′ cure: | | | | | |
| ASTM oil #1 | −11 | −11 | −12 | −11 | −12 |
| ASTM oil #3 | −8 | −9 | −9 | −13 | +4 |

The data demonstrate the excellent retention of oil resistance as well as physical properties when butadiene-acrylonitrile elastomers are extended with 50 or even 100 parts of sulfo-resin per 100 parts of elastomer.

The utility of the novel cyclodiene sulfo-resins is by no means limited to elastomeric compositions. There are numerous applications of thermoplastic resins in plastic compositions where some degree of oil resistance is advantageous. For example, as a resin binder in mastic floor tile the sulfo-resins are superior to the widely used hydrocarbon resins because they result in better oil resistance.

In general the sulfo-resins may be used in floor tile compositions as part of the binder. That is, in mastic floor tile the binder may consist of about 50 to 75 percent sulfo-resin and 50 to 25% plasticizer such as coal tar pitch, lube oil extract, vegetable oil gel or like materials well known in the art. In addition to the binder, the floor tile will contain mainly an inert filler such as whiting, barytes, clay, asbestos, carbon black, oxides of iron or antimony, other pigments or colors, organic fillers such as wood flour or ground cork, or any mixture of the foregoing. In general the tile will thus consist essentially of about 70 to 85% of filler, the balance being mainly the binder.

Of course, apart from their use in mastic floor tiles, the novel sulfo-resins are also useful in curable rubber-type floor tiles. These can be formulated by proper modification of the compounds given in the preceding examples, e. g. by adding thereto the usual amount of clay or other filler, as will be readily apparent to those skilled in the art. Also, blends of these sulfo-resins with other resinous polymers such as high styrene copolymers with butadiene for shoe soles and luggage are advantageous.

When defining any property of the novel sulfo-resins in the present specification and claims as being "in the absence of diluent," it will be understood that this is done principally so as to characterize the intrinsic property of the resin itself more exactly, and not as a requisite limitation of the novel composition of matter or of its process of preparation. On the contrary, the use of diluents in the preparation of the resin may actually be preferred for reasons of convenience as described earlier herein, in which event properties such as viscosity and softening point of the resulting product will of course be lower than if a corresponding resin had been prepared in the absence of any diluent.

Having described the general nature as well as specific illustrative embodiments of the invention, it will be understood that numerous variations and modifications are possible without departing from the scope and spirit hereof. The novelty of the invention is particularly pointed out and claimed in the appended claims.

What is claimed:

1. A thermoplastic resin obtained by heating at a temperature between about 280° and 350° F. a mixture of 30 to 300 parts of sulfur and 100 parts of an unsaturated hydrocarbon material consisting of a cyclic diolefin selected from the group consisting of monomer, dimer, trimer, tetramer, and pentamer of cyclopentadiene and methylcyclopentadiene, respectively, and mixtures thereof.

2. A thermoplastic resin obtained by heating at a temperature between about 280° to 330° F. a mixture of 30 to 300 parts of sulfur and 100 parts of dicyclopentadiene.

3. A process for preparing an oil resistant thermoplastic resin which comprises mixing 30 to 300 parts of sulfur with 100 parts of an unsaturated hydrocarbon material consisting of a cyclic diolefin, selected from the group consisting of monomer, dimer, trimer, tetramer, and pentamer of cyclopentadiene and methylcyclopentadiene, respectively, and mixtures thereof, and heating the mixture for at least one hour at a reaction temperature between about 280° and 350° F. such that evolution of substantial amounts of hydrogen sulfide is avoided, the amount of sulfur present in the mixture being not more than 4 atoms of sulfur per double bond of the unsaturated hydrocarbon material.

4. A process for preparing a thermoplastic resin according to claim 3 wherein the unsaturated hydrocarbon material is dicyclopentadiene.

5. A process according to claim 3 wherein the reaction mixture comprises 40 to 200 parts of sulfur and further comprises about 5 to 50 parts of an inert diluent, said heating being carried out in a closed zone at a pressure of up to about 100 p. s. i. g.

6. A process according to claim 5 wherein the diluent is an inert hydrocarbon having a boiling point in excess of 400° F.

7. A process according to claim 5 wherein the diluent is an alkyl ester of a polybasic acid having 4 to 12 carbon atoms per alkyl group, said acid being selected from the class consisting of phosphoric, phthalic, adipic and sebacic acids.

References Cited in the file of this patent

UNITED STATES PATENTS

| | | |
|---|---|---|
| 1,882,976 | Schmidt et al. | Oct. 18, 1932 |
| 1,926,687 | Palmer et al. | Sept. 12, 1933 |
| 2,225,684 | Chittick | Dec. 24, 1940 |
| 2,309,692 | Chittick et al. | Feb. 2, 1943 |
| 2,316,964 | McKinney et al. | Apr. 20, 1943 |
| 2,387,993 | Hepp | Oct. 30, 1945 |
| 2,398,271 | Zimmer et al. | Apr. 9, 1946 |
| 2,516,230 | Marhafer | July 25, 1950 |

PO-1050
(5/69)

UNITED STATES PATENT OFFICE
CERTIFICATE OF CORRECTION

Patent No. 2,806,843     Dated September 17, 1957

Inventor(s) Lester Marshall Welch

It is certified that error appears in the above-identified patent and that said Letters Patent are hereby corrected as shown below:

In The Specification

Column 1, line 48, after "Thiokol" insert

-- polysulfide rubber --.

Signed and sealed this 13th day of April 1971.

(SEAL)
Attest:

EDWARD M. FLETCHER, JR.
Attesting Officer

WILLIAM E. SCHUYLER, JR.
Commissioner of Patents